United States Patent
Robbin et al.

(10) Patent No.: US 7,234,026 B2
(45) Date of Patent: Jun. 19, 2007

(54) MEDIA PLAYER WITH INSTANT PLAY CAPABILITY

(75) Inventors: Jeffrey L. Robbin, Los Altos, CA (US); Ned K. Holbrook, Sunnyvale, CA (US); Steven Bollinger, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/131,800

(22) Filed: May 17, 2005

(65) Prior Publication Data

US 2005/0216674 A1 Sep. 29, 2005

Related U.S. Application Data

(63) Continuation of application No. 10/118,217, filed on Apr. 5, 2002, now Pat. No. 6,934,812.

(60) Provisional application No. 60/346,236, filed on Oct. 22, 2001.

(51) Int. Cl.
*G06F 12/00* (2006.01)
*G06F 13/00* (2006.01)

(52) U.S. Cl. .................. 711/138; 711/113; 711/118; 710/53; 710/54

(58) Field of Classification Search .................. None
See application file for complete search history.

(56) References Cited

U.S. PATENT DOCUMENTS

| | | | |
|---|---|---|---|
| 5,608,698 A | 3/1997 | Yamanoi et al. | |
| 5,617,386 A | 4/1997 | Choi | |
| 5,712,949 A | 1/1998 | Kato et al. | |
| 5,740,143 A | 4/1998 | Suetomi | |
| 5,822,288 A | 10/1998 | Shinada | |
| 5,870,710 A | 2/1999 | Ozawa et al. | |
| 6,332,175 B1 | 12/2001 | Birrell et al. | |
| 6,377,530 B1 | 4/2002 | Burrows | |
| 6,801,964 B1 * | 10/2004 | Mahdavi | 710/35 |
| 6,934,812 B1 * | 8/2005 | Robbin et al. | 711/138 |
| 2002/0045961 A1 | 4/2002 | Gibbs et al. | |

FOREIGN PATENT DOCUMENTS

| | | |
|---|---|---|
| DE | 43 34 773 | 4/1994 |
| DE | 44 45 023 | 6/1996 |
| EP | 1 028 425 | 8/2000 |

OTHER PUBLICATIONS

Kennedy, "Digital Data Storage Using Video Disc," IBM Technical Disclosure Bulletin, vol. 24, No. 2, Jul. 1981.

Nonhoff-Arps, et al., "Straβenmusik Portable MP3-Spieler mit USB-Anschluss," CT Magazin Fuer Computer Technik, Verlag Heinz Heise GMBH, Hannover DE, No. 25, Dec. 4, 2000.

\* cited by examiner

*Primary Examiner*—T Nguyen
(74) *Attorney, Agent, or Firm*—Beyer Weaver LLP

(57) ABSTRACT

A media player and a method for operating a media player are disclosed. A media program is able to substantially immediately begin playing after a media play selection has been made. Through intelligent operation, the media program is able to start playing even before the media program has been substantially or completely loaded from disk storage into semiconductor memory (i.e., cache memory). Additionally, the media program can be loaded into semiconductor memory through use of a background process without disturbing the playing of the media program. Further, if desired, the disk storage is able to be aggressively "powered off" when not being accessed, thereby enhancing battery life when being battery-powered.

24 Claims, 6 Drawing Sheets

MEDIA PLAYER WITH INSTANT PLAY CAPABILITY

CROSS-REFERENCE TO RELATED APPLICATION

This application is a continuation of U.S. application Ser. No. 10/118,217, filed Apr. 5, 2002 now U.S. Pat. No. 6,934,812, and entitled "MEDIA PLAYER WITH INSTANT PLAY CAPABILITY," which is hereby incorporated herein by reference, and which claims the benefit of priority of U.S. Provisional Application No. 60/346,236, filed Oct. 22, 2001, and entitled "MEDIA PLAYER WITH INSTANT PLAY CAPABILITY," which is hereby incorporated herein by reference.

BACKGROUND OF THE INVENTION

1. Field of the Invention

The present invention relates to media devices and, more particularly, to playing of media on media devices.

2. Description of the Related Art

Media players are becoming more popular these days. Of particular popularity are portable media players such as MP3 players or DVD players. Media players operate to play media items for their user that are stored within the media players. The media items are most commonly audio items (e.g., songs) but could also be video items (e.g., DVDs). Typically, an MP3 player will store various audio items internally on a storage disk. When the user makes a selection to play one of the stored audio items, the audio item must first be loaded into semiconductor memory (i.e., Random-Access Memory) before the audio item begins to be played. Unfortunately, the delay in reading the rather large file for the audio item is unsatisfactory to users who are anxious to hear the audio item they have already selected to be played. Thus, there is a need for improved techniques for media players to play media items.

SUMMARY OF THE INVENTION

Broadly speaking, the invention relates to a media player and a method for operating a media player. According to one aspect of the invention, a media program is able to substantially immediately begin playing after a media play selection has been made. Through intelligent operation, the media program is able to start playing even before the media program has been loaded from disk storage into semiconductor memory (i.e., cache memory). According to another aspect of the invention, the loading of the media program into semiconductor memory is performed in a background process without disturbing the playing of the media program. Still another aspect of the invention is that the disk storage is able to be aggressively "powered off" when not being accessed, thereby enhancing battery life when being battery-powered. The invention can be implemented in numerous ways, including as a method, system, device, apparatus, or computer readable medium.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to a media player and a method for operating a media player. According to one aspect of the invention, a media program is able to substantially immediately begin playing after a media play selection has been made. Through intelligent operation, the media program is able to start playing even before the media program has been substantially or completely loaded from disk storage into semiconductor memory (i.e., cache memory). According to another aspect of the invention, the loading of the media program into semiconductor memory is performed in a background process without disturbing the playing of the media program. Still another aspect of the invention is that the disk storage is able to be aggressively "powered off" when not being accessed, thereby enhancing battery life when being battery powered. The invention is particularly suitable for use with portable media players.

Embodiments of this aspect of the invention are discussed below with reference to FIGS. 1–6. However, those skilled in the art will readily appreciate that the detailed description given herein with respect to these figures is for explanatory purposes as the invention extends beyond these limited embodiments.

Figure 1:
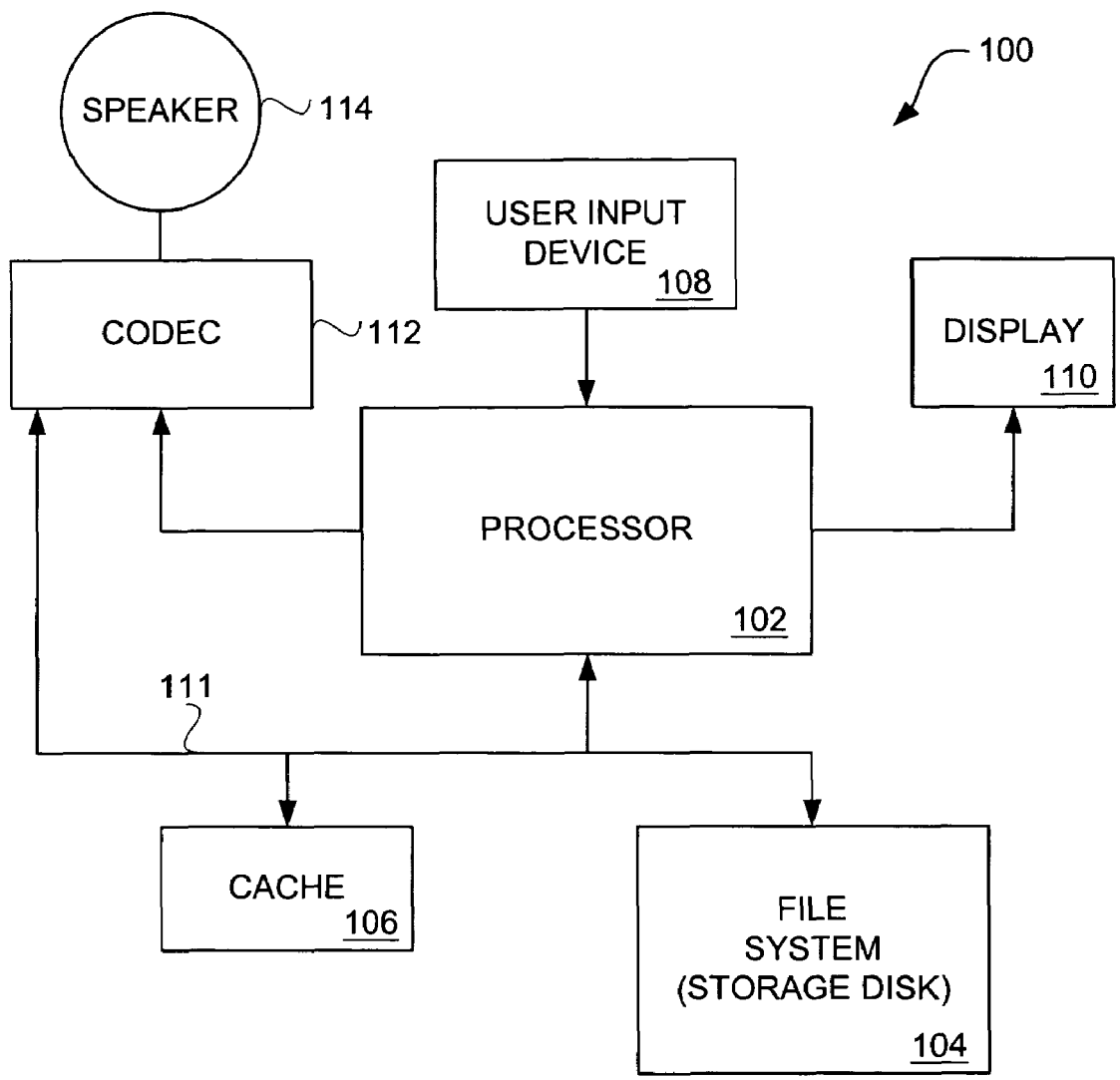
FIG. 1 is a block diagram of a media player according to one embodiment of the invention.

FIG. 1 is a block diagram of a media player 100 according to one embodiment of the invention. The media player 100 includes a processor 102 that pertains to a microprocessor or controller for controlling the overall operation of the media player 100. The media player 100 stores media data pertaining to media items in a file system 104 and a cache 106. The file system 104 is, typically, a storage disk or a plurality of disks. The file system typically provides high capacity storage capability for the media player 100. However, since the access time to the file system 104 is relatively slow, the media player 100 also includes a cache 106. The cache 106 is, for example, Random-Access Memory (RAM) provided by semiconductor memory. The relative access time to the cache 106 is substantially shorter than for the file system 104. However, the cache 106 does not have the large storage capacity of the file system 104.

Further, the file system 104, when active, consumes more power than does the cache 106. The power consumption is particularly important when the media player 100 is a portable media player that is powered by a battery (not shown).

The media player 100 also includes a user input device 108 that allows a user of the media player 100 to interact with the media player 100. For example, the user input device 108 can take a variety of forms, such as a button, keypad, dial, etc. Still further, the media player 100 includes a display 110 (screen display) that can be controlled by the processor 102 to display information to the user. A data bus 111 can facilitate data transfer between at least the file system 104, the cache 106, the processor 102, and the CODEC 112.

In one embodiment, the media player 100 serves to store a plurality of media items (e.g., songs) in the file system 104. When a user desires to have the media player play a particular media item, a list of available media items is displayed on the display 110. Then, using the user input device 108, a user can select one of the available media items. The processor 102, upon receiving a selection of a particular media item, supplies the media data (e.g., audio file) for the particular media item to a coder/decoder (CODEC) 112. The CODEC 112 then produces analog output signals for a speaker 114. The speaker 114 can be a speaker internal to the media player 100 or external to the media player 100. For example, headphones or earphones that connect to the media player 100 would be considered an external speaker.

According to the invention, the processor 102 controls the playing of the particular media item such that upon receiving the user's selection of the particular media item, the processor 102 immediately accesses the file system 104 or the cache 106 to retrieve an initial portion of the media data and supplies it to the CODEC 112 and thus begins playing the media item. When the media item is not initially available in the cache 106 (which is typically the case), the initial portion is retrieved from the file system 104. However, since the access speed of the file system 104 is relatively slow compared to the access speed needed for the playing of the media item, and because the file system 104 consumes significant amounts of power of the media player 100, the media data for the media item is loaded into the cache 106 such that once the media data has been loaded into the cache 106, all remaining portions of the media data for the particular media item are retrieved from the cache 106. Consequently, the media item is played almost substantially immediately following the user's selection because the initial portion is obtained immediately from the file system 104 and then subsequent portions are obtained from the cache 106. Here, the cache 106 is loaded at the same time that the retrieval or playing of the initial portion of the media data occurs.

Still further, once the media data for the particular media item has been loaded into the cache 106, the file system 104 can be inactivated (e.g., placed in a low power mode) to save power consumption for the media player 100. By deactivating the file system 104 in this matter, battery life of the media player 100 is able to be significantly improved, assuming the media player 100 is a battery-operated device (portable device).

In one embodiment, the media player is a portable computing device dedicated to processing media such as audio, video or images. For example, the media player 100 can be a music player (e.g., MP3 player), a game player, a video player, a video recorder, a camera, an image viewer and the like. These devices are generally battery operated and highly portable so as to allow a user to listen to music, play games or video, record video or take pictures wherever the user travels. In one implementation, the media player is a handheld device that is sized for placement into a pocket or hand of the user. By being handheld, the media player is relatively small and easily handled and utilized by its user. By being pocket sized, the user does not have to directly carry the device and therefore the device can be taken almost anywhere the user travels (e.g., the user is not limited by carrying a large, bulky and often heavy device, as in a portable computer). Furthermore, the device may be operated by the users hands, no reference surface such as a desktop is needed.

Figure 2:
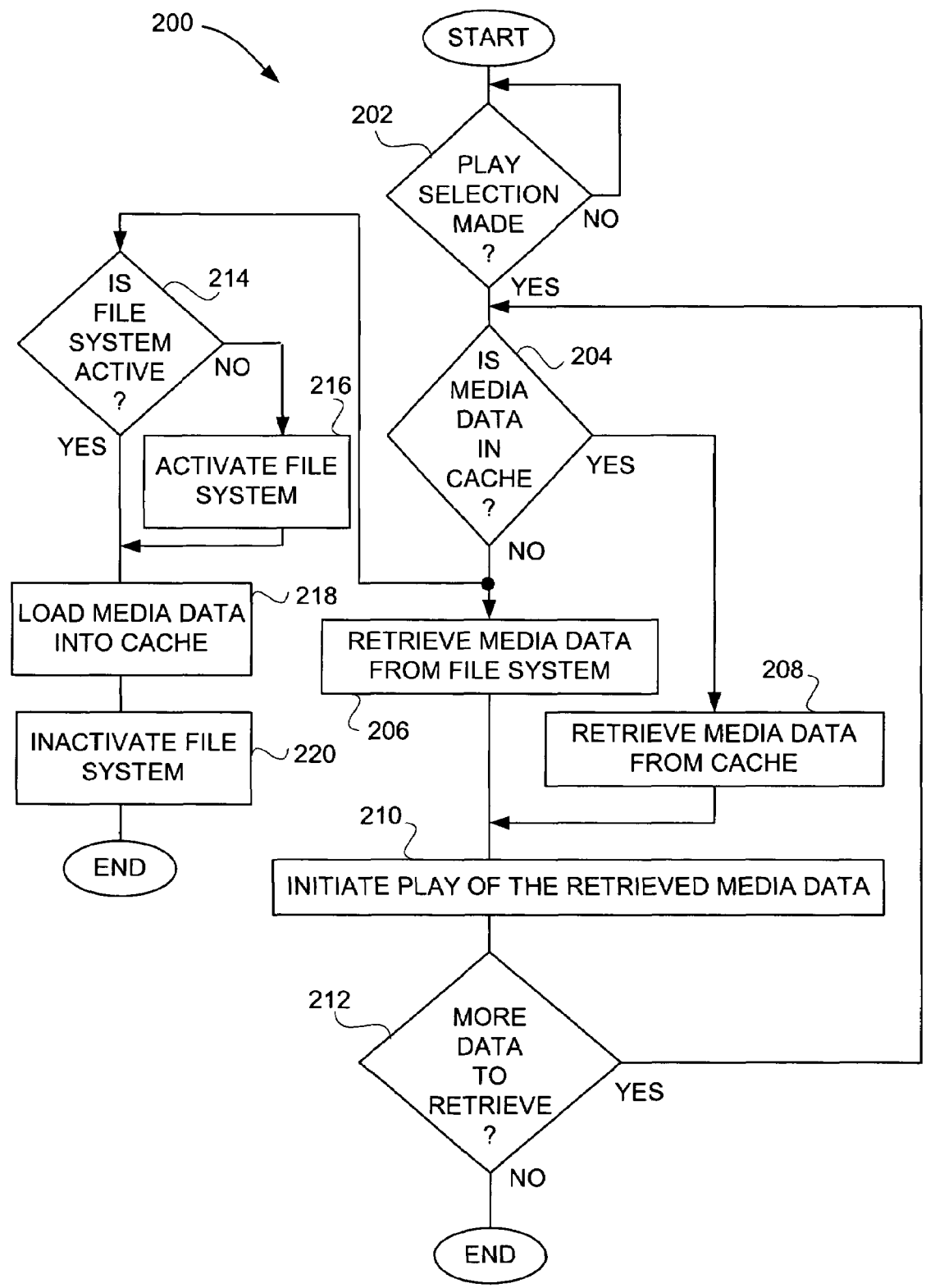
FIG. 2 is a flow diagram of media play processing according to one embodiment of the invention.

FIG. 2 is a flow diagram of media play processing 200 according to one embodiment of the invention. The media play processing 200 is, for example, performed by the media player 100 illustrated in FIG. 1.

The media play processing 200 initially begins with a decision 202 that determines whether a play selection has been made. When the decision 202 determines that a play selection has not been made, then the media play processing 200 awaits such a selection. In other words, the media play processing 200 is effectively invoked when a play selection is made. In any case, once the decision 202 determines that a play selection has been made, then a decision 204 determines whether the media data for the play selection is in a cache (e.g., cache 106, FIG. 1). When the decision 204 determines that the media data is not in the cache, then the media data is retrieved 206 from a file system (e.g., file system 104, FIG. 1). Alternatively, when the decision 204 determines that the media data is in the cache, then the media data is retrieved 208 from the cache. Here, it is preferable that the media data be retrieved from the cache because its access time is substantially shorter than that of the file system. In addition, when the media data is available in the cache, the file system is typically not needed, and thus it can be placed in a low power mode to reduce power consumption.

Following operations 206 or 208, the media play processing 200 initiates 210 playing of the retrieved media data. Here, the retrieved media data can be directed to be played so that the media player produces multimedia output (e.g., audio) for its user. However, only a portion of the media data is initially obtained and thus a decision 212 next determines whether there is more data to be retrieved. When the decision 212 determines that there is more data associated with the media item being played to be retrieved, then the media play processing 200 returns to repeat the decision 204 and subsequent operations so that additional media data can be retrieved and played.

Concurrently with the operations of 206–212, when the decision 204 determines that the media data is not in the cache, then other processing can be invoked to load the media data into the cache. In particular, according to one embodiment, such processing is performed by a separate process (e.g., thread) operating within the media player. According to such processing, a decision 214 determines whether the file system is active. When the decision 214 determines that the file system is not active, then the file system is activated 216. Here, activation refers to placing the file system in its normal operating mode, and an inactivated file system refers to a reduced-power operation mode. Following the operation 216, as well as following the decision 214 when the file system is already active, the media data for the particular media item is loaded 218 into the cache. Here, the loading 218 occurs by this process while other operations are being performed in another process to retrieve and play at least an initial portion of the media data (operations 206–212). Once the media data has been loaded 218 into the cache, the file system can be inactivated 220 to reduce power consumption. Typically, the file system is not needed for a period of time, at least on the order of the duration of the media item being played, since the remaining amount of media data is now available within the cache. Following the operation 220, the cache loading process is complete and ends. Further, once the cache loading process has completed, the next time the media play processing 200 performs the decision 204, the result will be that all subsequent media data for the particular media item will be retrieved from the cache at operation 208.

Figure 3:
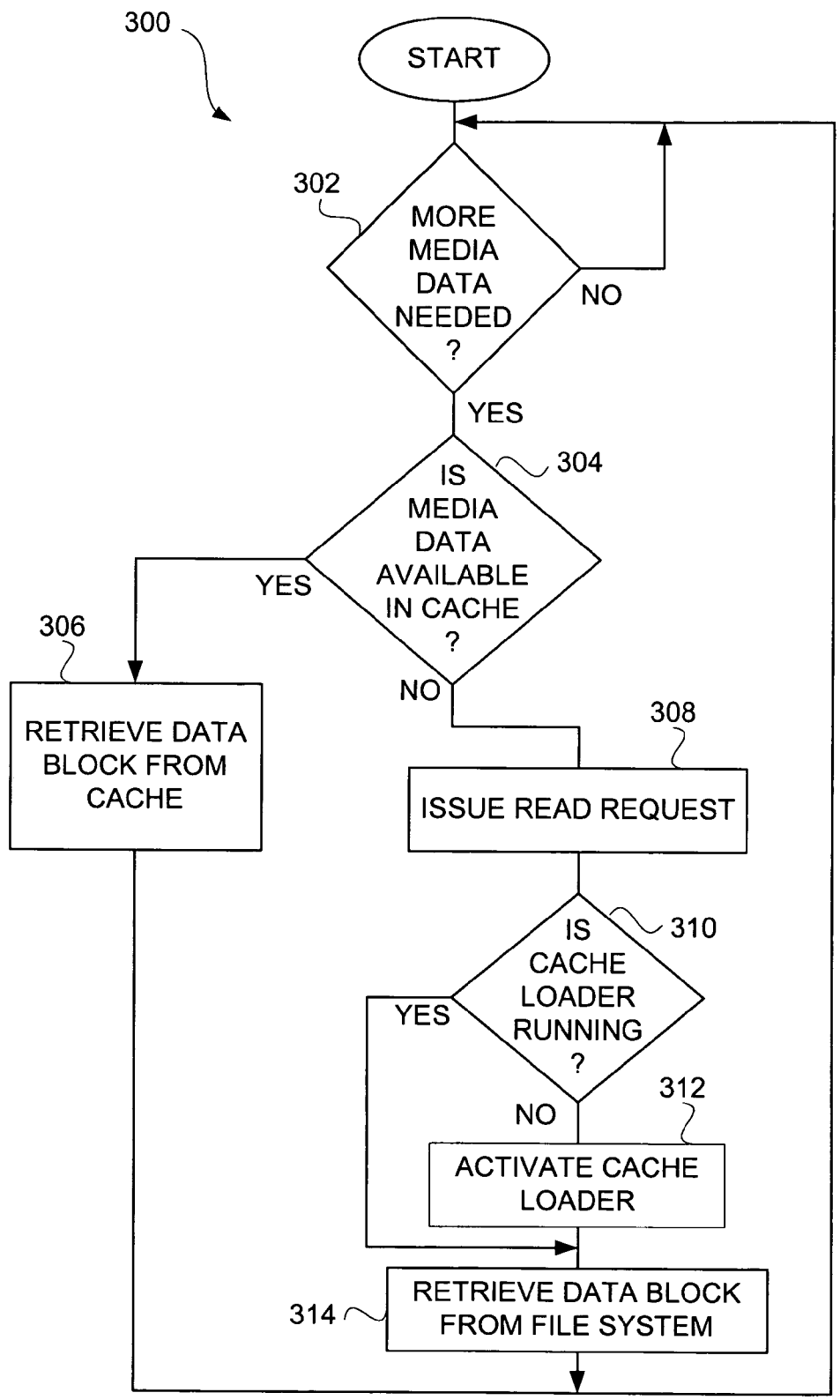
FIG. 3 is a flow diagram of media data retrieval processing according to one embodiment of the invention.

FIG. 3 is a flow diagram of media data retrieval processing 300 according to one embodiment of the invention. The media data retrieval processing 300 is, for example, performed by a media device, such as the media device 100 illustrated in FIG. 1. In one embodiment, the media data retrieval processing 300 is performed or controlled by the processor 102 of the media device 100 shown in FIG. 1.

The media data retrieval processing 300 begins with a decision 302 that determines whether more media data is needed. Hence, the decision 302, for example, pertains to the CODEC 112 requesting media data pertaining to a media item that is to be played by the media device 100. Typically, the CODEC 112 operates to buffer a short play duration of media data and thus periodically requests additional data from data storage provided by the media device 100. Hence, when the decision 302 determines that more media data is not needed, then the media data retrieval processing 300, in effect, awaits the need (or request) for more media data.

Once the decision 302 determines that more media data is needed, then a decision 304 determines whether the media data is available in the cache memory. For example, the cache memory can be the cache 106 illustrated in FIG. 1. When the decision 304 determines that the media data is available in the cache memory, then a data block is retrieved from the cache memory. Here, the data block being retrieved 306 pertains to the next needed portion of the media data associated with the media item.

On the other hand, when the decision 304 determines that the media data is not available in the cache memory, then processing is performed to retrieve the media data from the file system. The file system is, for example, the file system 104 illustrated in FIG. 1. More particularly, a read request is issued 308 to the file system to read a data block. The read request prepares the file system 104 (storage disk) for read/write access. For example, if the file system 104 is in an inactive (low-power) state, the read request can return the file system 104 to an active state. Typically, the storage disk is spinning and ready for read/write access when in the active state.

Next, a decision 310 determines whether a cache loader is already running. Here, "running" of the cache loader means that the cache loader is active in loading media data into the cache memory. When the decision 310 determines that the cache loader is not already running, then the cache loader is activated 312. Alternatively, when the decision 310 determines that the cache loader is already running, then the operation 312 is bypassed. Following the operation 312, as well as following the decision 310 when the cache loader is already running, a data block is retrieved 314 from the file system (storage disk). Here, the size of the data block being retrieved 314 is kept small so that the retrieval time from the file system is still relatively short (e.g., a few milliseconds) and so that retrieval times for other concurrent accesses to the file system (such as by the cache loader) are not significantly impeded and thus can be performed in a timely fashion. As an example, the data block can have a reasonably small size, such as a size in the range of 32–256 kilobytes and more likely one of 32, 64, 128 or 256 kilobytes. Following the operations 306 and 314, the media data retrieval processing 300 returns to repeat the decision 302 and subsequent operations so that additional media data can be obtained in the same manner.

Figure 4:
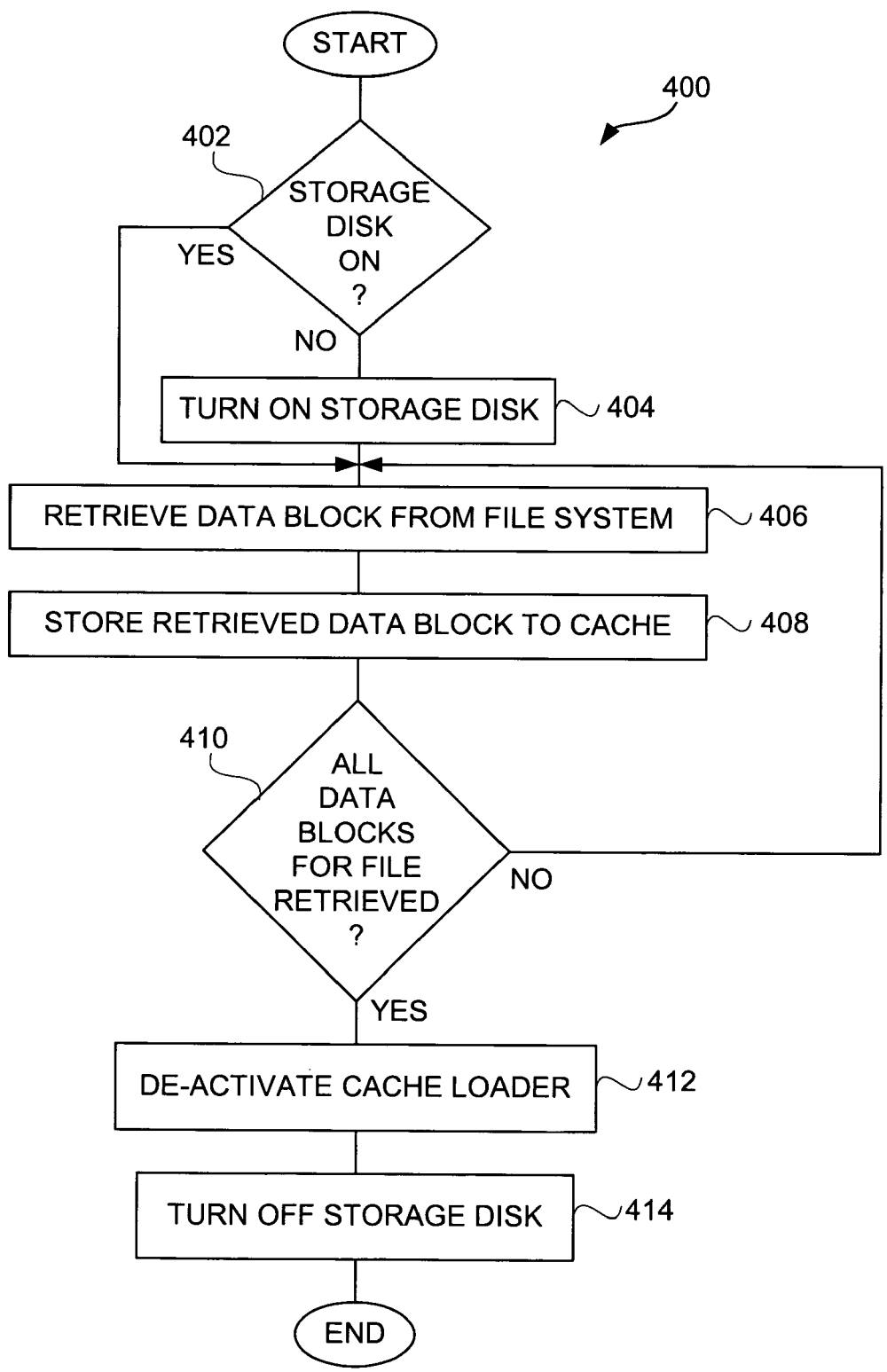
FIG. 4 is a flow diagram of cache loader processing according to one embodiment of the invention.

FIG. 4 is a flow diagram of cache loader processing 400 according to one embodiment of the invention. The cache loader processing 400 is, for example, processing performed by the cache loader that is activated in operation 312 illustrated in FIG. 3.

The cache loader processing 400 begins with a decision 402 that determines whether the storage disk is "on" (active). Here, the storage disk (i.e., hard drive) pertains to disk storage of data provided by a file system, namely, the file system 104 illustrated in FIG. 1. More generally, the decision 402 could indicate whether the file system is active. In any case, when the decision 402 determines that the storage disk is not "on," then the storage disk is turned on 404. This is also referred to as "spinning-up" the storage disk. Access times to storage disks are considerably slower when the storage disk is not already on (spinning). "Spinning-up" the storage disk is a prerequisite to accessing data from the storage disk. Hence, the operations 402 and 404 cause the storage disk to be turned on 404 when not already turned on.

Thereafter, a data block is retrieved 406 from the file system. Here, for example, a block of data pertaining to a particular media item is retrieved 406 from the file system 104 (storage disk). The retrieved data block is then stored 408 to the cache memory. For example, the cache memory could be the cache 106 illustrated in FIG. 1.

A decision 410 then determines whether all of the data blocks for the file (i.e., media item) have been retrieved. When the decision 410 determines that all of the data blocks for the file have not yet all been retrieved, then the cache loader processing 400 returns to repeat the operation 406 and subsequent operations so that additional data blocks pertaining to the file (i.e., media item) can be retrieved 406 and stored 408 into the cache memory. Once the decision 410 determines that all of the data blocks for the file have been retrieved, then the cache loader is de-activated 412. The cache loader is the process that is performing the cache loader processing 400 and thus, when de-activated 412, the process that is performing the cache loader processing 400 can be closed. Additionally, the storage disk is then turned off 414. When the storage disk is turned off 414, the media device is able to conserve the energy or power it would otherwise use to keep the storage disk turned on.

The invention is well suited for implementation using multiple threads of execution, such as provided by a multi-threaded programming environment. For example, the media data retrieval processing 300 of FIG. 3 and the cache loader processing 400 can be implemented by separate threads. The processing shown in FIGS. 5 and 6 below can also pertain to other threads of execution.

Figure 5:
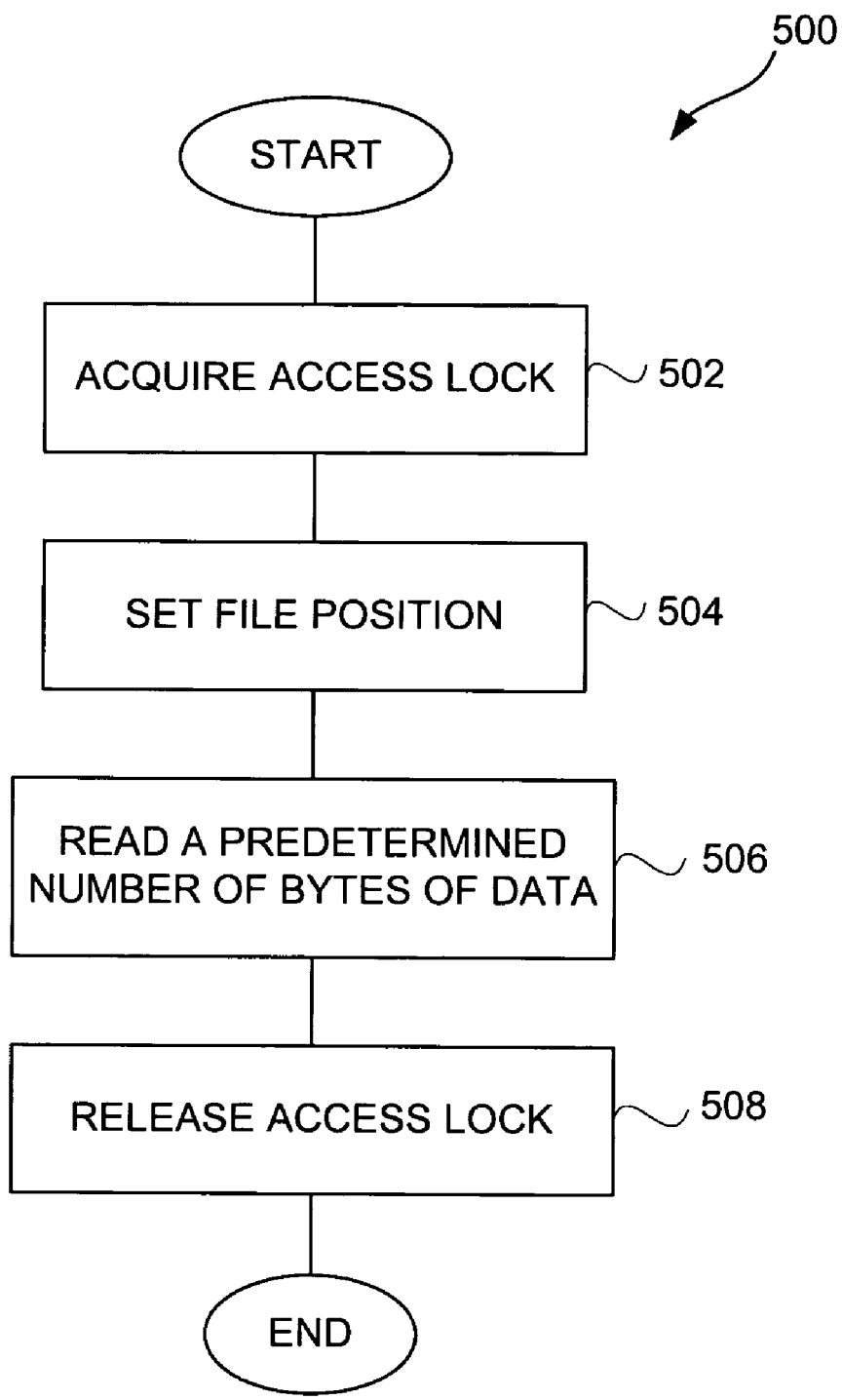
FIG. 5 is a flow diagram of data access processing according to one embodiment of the invention.

FIG. 5 is a flow diagram of data access processing 500 according to one embodiment of the invention. The data access processing 500 is, for example, performed by the operation 314 of the media data retrieval processing 300 shown in FIG. 3 or the operation 406 of the cache loader processing 400 illustrated in FIG. 4. In any case, the data access processing 500 operates to acquire 502 an access lock for access to the file system. Given that multiple different threads of execution can be seeking the same access lock to the file system, these different threads contend for acquisition of the access lock. Hence, the data access processing 500 could be delayed in the event that another thread presently holds the access lock. Nevertheless, per program or implementation design, each of the threads that may be utilizing the access lock do so only for a short duration of time (on the order of milliseconds). Hence, any delay incurred while waiting for the access lock is manageable. After the access lock is acquired 502, a file position is set 504. The file position indicates a starting point in a file at which data is to be read. Hence, after the file position is set 504, a predetermined number of bytes of data can be read 506 from the file stored in the file system. Here, the predetermined number of bytes is also managed such that the block of data being read is rather small (e.g., 32, 64, 128 or 256 kilobytes) so that the access lock is not unavailable for an extended period of time. After the predetermined number of bytes of data is read 506, the access lock is released 508 because the access to the file system is, at this point, completed. Hence, after the access lock is released 508, the data access processing 500 is complete and ends.

Figure 6:
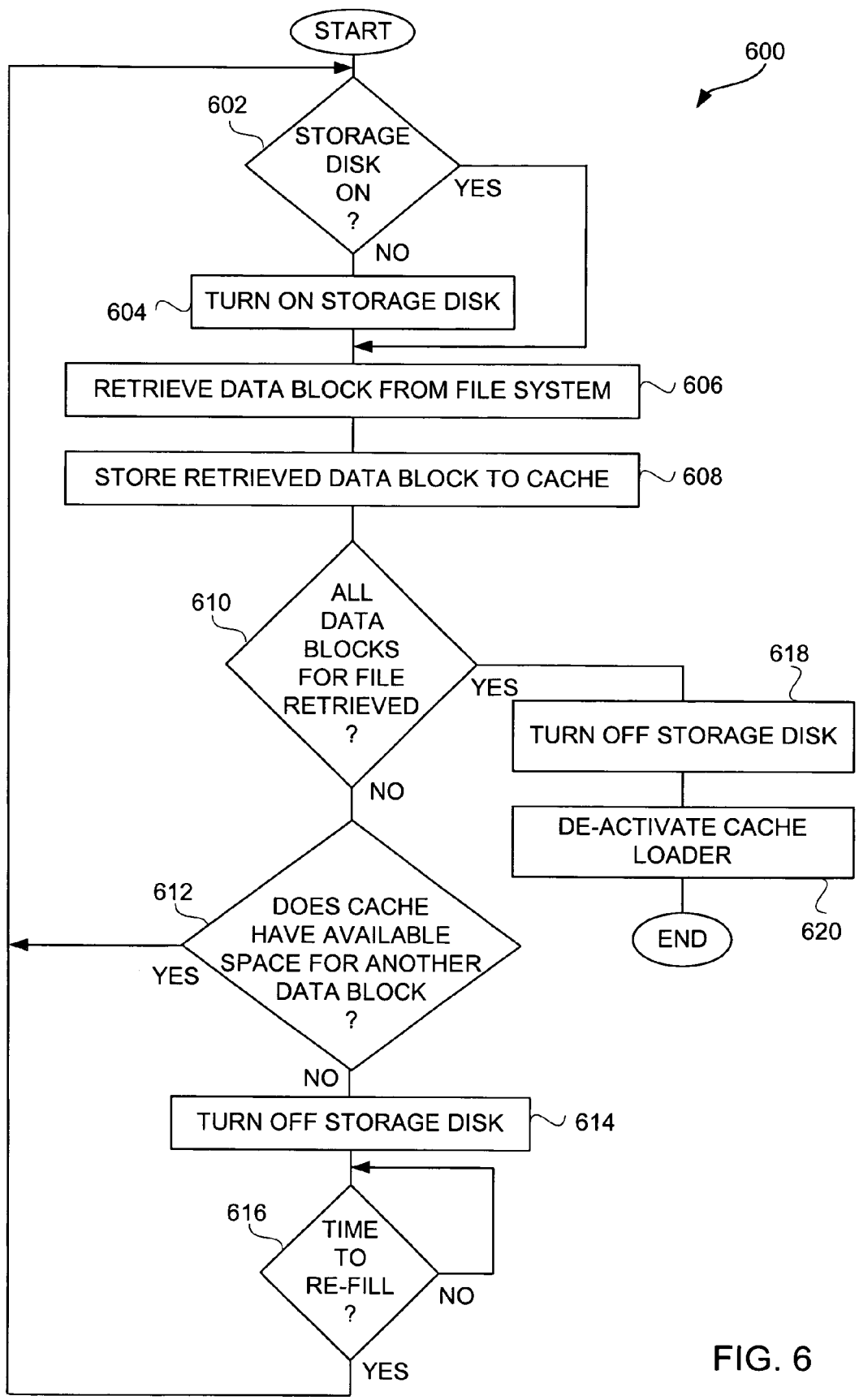
FIG. 6 is a flow diagram of cache loader processing according to another embodiment of the invention.

FIG. 6 is a flow diagram of cache loader processing 600 according to another embodiment of the invention. The cache loader processing 600 has features similar to the cache loader processing 400 illustrated in FIG. 4. However, the cache loader processing 600 is designed to provide efficient utilization of the storage disk in cases in which the file (i.e., media item) to be loaded in the cache memory exceeds the available capacity of the cache memory.

The cache loader processing 600 begins with a decision 602 that determines whether the storage disk (e.g., hard drive) is "on." When the decision 602 determines that the storage disk is not "on," then the storage disk is turned on 604. Alternatively, when the decision 602 determines that the storage disk is already "on," then the operation 604 is bypassed. In any case, a data block is then retrieved 606 from the file system. As an example, the retrieval 606 of the data block can be performed in accordance with the data access processing 500 discussed above with respect to FIG. 5. Once the data block is retrieved from the file system, the retrieved data block is then stored 608 into the cache memory. Next, a decision 610 determines whether all of the data blocks for the file (i.e., media item) have been retrieved. When the decision 610 determines that all of the data blocks for the file have not yet been retrieved, then a decision 612 determines whether the cache memory has available space for another data block. When the decision 612 determines that the cache memory does have available space for another data block, then the cache loader processing 600 can return to repeat the operation 602 and subsequent operations so that at least one additional data block for the file (i.e., media item) can be retrieved and stored in the cache memory. On the other hand, when the decision 612 determines that the cache memory does not have available space for any additional data blocks, then the storage disk is turned off 614. By turning off the hard drive, the media device is able to conserve energy when the file system is temporarily not needed. A decision 616 then determines whether it is time to re-fill the cache memory. When the decision 616 determines that it is not yet time to fill the cache memory, the cache loader processing 600 awaits a more suitable time. In other words, the decision 616 causes a delay in the cache loader processing 600. The delay can be a predetermined delay, or can be signaled based upon the amount of available space in the cache memory or the amount of data remaining to be played before additional data is needed. Hence, regardless of the particular criteria utilized, when the decision 616 determines that it is time to re-fill the cache memory, then the cache loader processing 600 returns to repeat the decision 602 and subsequent operations so that one or more additional data blocks can be retrieved from the file system and stored to the cache memory such that the data, when needed by other threads, is available in the cache memory for high-speed access.

On the other hand, when the decision 610 determines that all of the data blocks for the file (i.e., media item) have been retrieved, then the storage disk is turned off 618. Here, the storage disk is turned off 618 because the file (i.e., media item) has been completely retrieved from the file system and thus the storage disk is no longer needed with respect to that media item. Of course, if another thread is in need of the file system, the storage disk could be left "on" and the other data access performed. In any case, the cache loader is then deactivated 620 because the file (media item) has been fully acquired and stored in the cache memory. Following the operation 620, the cache loader processing 600 is complete and ends.

The various aspects or features of the invention described above can be used alone or in various combinations.

Although the media items of emphasis in several of the above embodiments where audio items (e.g., audio files or songs), the media items are not limited to audio items. For example, the media item can alternatively, pertain to videos (e.g., movies) or images (e.g., photos).

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield one or more of the following advantages. One advantage of the invention is that media items can be played by a media device almost immediately after a play selection is requested. Consequently, users tend to be less anxious and less frustrated because the delay imposed before initiating playing is able to be substantially reduced. Another advantage of the invention is that media data (e.g., for audio playing) is able to be retrieved from either a cache or a file system with minor changes to other system components or software. Another advantage of the invention is that power consumption is reduced by transferring data to a cache memory and deactivating a file system.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for retrieving and playing media data by a media player, the media player having a disk-based data store and a semiconductor-based data store, said method comprises:

identifying a media item to be played on the media player, media data for the media item includes a plurality of data portions, the data portions including a first portion and remaining portions, the remaining portions being different than and not including the initial portion;

retrieving the first portion of the media data for the media item from the disk-based data store;

playing the first portion of the media data for the media item retrieved from the disk-based data store without first storing to the semiconductor-based data store, the semiconductor-based data store having a faster access time than does the disk-based data store;

initiating processing to load at least the remaining portions of the media data from the disk-based data store to the semiconductor-based data store; and playing the remaining portions of the media data retrieved from the semiconductor-based data store.

2. A method as recited in claim 1, wherein said initiating is performed substantially concurrently with said retrieving.

3. A method as recited in claim 1, wherein said playing of the remaining portions comprises:

determining when additional media data is needed beyond the first portion;

retrieving at least one of the remaining portions of the media data from the semiconductor-based data store when said determining determines that the additional media data is needed; and playing the at least one of the remaining portions of the media data retrieved from the semiconductor-based data store.

4. A method as recited in claim 3, wherein said initiating processing operates to load the remaining portions from the disk-based data store to the semiconductor-based data store in a portion-by-portion manner.

5. A method as recited in claim 1, wherein said method further comprises:

deactivating the disk-based data store after all the remaining portions of the media data have been loaded into the semiconductor-based data store.

6. A method as recited in claim 1, wherein the media player is a pocket-sized device.

7. A method as recited in claim 1, wherein the media player is a handheld music player.

8. A method as recited in claim 1, wherein the disk-based data store of the media player stores a plurality of media items, and wherein the media player comprises at least one of an audio player, a video player and an image viewer, and wherein the media items include at least one of audio files of songs, video files of videos and image files of images.

9. A method for retrieving and playing media data by a media player, the media player having a disk-based data store and a semiconductor-based data store, said computer readable medium comprises:

identifying a media item to be played on the media player, media data for the media item includes a plurality of data portions, the data portions including a first portion and remaining portions, the remaining portions being different than and not including the initial portion;

initiating processing to load at least the remaining portions of the media data from the disk-based data store to the semiconductor-based data store;

retrieving the first portion of the media data for the media item from the disk-based data store;

playing the first portion of the media data for the media item retrieved from the disk-based data store without first storing to the semiconductor-based data store, the semiconductor-based data store having a faster access time than does the disk-based data store; and playing the remaining portions of the media data retrieved from the semiconductor-based data store.

10. A method as recited in claim 9, wherein said playing of the remaining portions comprises:

determining when additional media data is needed beyond the first portion;

retrieving at least one of the remaining portions of the media data from the semiconductor-based data store when said determining determines that the additional media data is needed; and playing the at least one of the remaining portions of the media data retrieved from the semiconductor-based data store.

11. A method as recited in claim 10, wherein said initiating processing operates to load the remaining portions from the disk-based data store to the semiconductor-based data store in a portion-by-portion manner.

12. A method as recited in claim 9, wherein said method further comprises:

deactivating the disk-based data store after all the remaining portions of the media data have been loaded into the semiconductor-based data store.

13. A method as recited in claim 12, wherein the media player is a pocket-sized device.

14. A method as recited in claim 12, wherein the media player is a handheld music player.

15. A method as recited in claim 12, wherein the disk-based data store of the media player stores a plurality of media items, and wherein the media player comprises at least one of an audio player, a video player and an image viewer, and wherein the media items include at least one of audio files of songs, video files of videos and image files of images.

16. A consumer electronics product, comprising:

a first storage device that stores a plurality of media items;

a user input device that enables a user of said consumer electronics product to at least select a particular media item from the plurality of media items, the particular media item having a first portion and subsequent portions, the subsequent portions being different than and not including the first portion;

an output device for playing back the particular media item;

a second storage device capable of storing at least one of the media items, said second storage device has substantially faster access than does said first storage device; and a processor operatively connected to said first storage device, said user input device and said second storage device, said processor causes the output device to play back the particular media item substantially immediately following the selection of the particular media item by the user without regard to whether media data for the particular media item resides in said second storage device or on said first storage device, wherein when the media data for the particular media item is not initially stored in said second storage device, said processor concurrently retrieves and plays a first portion of the media data directly from said first storage device while substantially concurrently initiating background loading subsequent portions of the media data for the particular media item from said first storage device into said second storage device, and wherein once the subsequent portions of the media data for the particular media items are available in said second storage device due to the background loading of the subsequent portions of the media data for the particular media item, said processor retrieves the subsequent portions of the media data for the particular media item from said second storage device.

17. A consumer electronics product as recited in claim 16, wherein at least a portion of the loading of the media data from said first storage device to said second storage device is performed concurrently with the playing of the first portion of the media data.

18. A consumer electronics product as recited in claim 16, wherein said consumer electronics product further comprises:
a display screen operatively connected to said processor, said display screen displays a list of the media items.

19. A consumer electronics product as recited in claim 18, wherein said consumer electronics products is a portable, battery-operated media player.

20. A consumer electronics product as recited in claim 16, wherein said consumer electronics product is a handheld media player.

21. A consumer electronics product as recited in claim 20, wherein said first storage device of said handheld media player stores a plurality of media items, and wherein said handheld media player comprises an audio player, and wherein the media items include at least audio files of songs.

22. A consumer electronics product as recited in claim 21, wherein at least a portion of the loading of the media data from said first storage device to said second storage device is performed concurrently with the playing of the first portion of the media data.

23. A consumer electronics product as recited in claim 16, wherein said first storage device of said consumer electronics product stores a plurality of media items, and wherein said consumer electronics product comprises a video player, and wherein the media items include at least video files of videos.

24. A consumer electronics product as recited in claim 23, wherein said consumer electronics product is a handheld media player.

* * * * *